(12) United States Patent
Batarseh et al.

(10) Patent No.: US 7,251,113 B1
(45) Date of Patent: Jul. 31, 2007

(54) ACTIVE TRANSIENT VOLTAGE COMPENSATOR FOR IMPROVING CONVERTER FAST TRANSIENT RESPONSE

(75) Inventors: Issa Batarseh, Orlando, FL (US); Xiangcheng Wang, Orlando, FL (US); Shamala A. Chickamenahalli, Chandler, AZ (US); Edward Stanford, Dupont, WA (US)

(73) Assignee: Research Foundation of The University of Central Florida, Orlando, FL (US)

( * ) Notice: Subject to any disclaimer, the term of this patent is extended or adjusted under 35 U.S.C. 154(b) by 145 days.

(21) Appl. No.: 11/067,261

(22) Filed: Feb. 25, 2005

(51) Int. Cl.
*H02H 7/122* (2006.01)

(52) U.S. Cl. ..................................... 361/111
(58) Field of Classification Search ................ 361/111

See application file for complete search history.

(56) References Cited

U.S. PATENT DOCUMENTS 6,903,914 B1 * 6/2005 Moussaoui .................. 361/111

\* cited by examiner

*Primary Examiner*—Michael Sherry
*Assistant Examiner*—Lucy Thomas
(74) *Attorney, Agent, or Firm*—Brian S. Steinberger; Phyllis K. Wood; Law Offices of Brian S. Steinberger, P.A.

(57) ABSTRACT

A direct current to direct current (DC-to-DC) converter having an active transient voltage compensator (ATVC) coupled with the DC-to-DC converter output terminal to improve a fast transient response of the DC-to-DC converter. The active transient voltage compensator compensates the DC output only during transient operation The ATVC includes a transformer for reducing the ATVC current stresses to improve the compensator efficiency and injecting, absorbing high slew rate current, and a controller circuit for controlling ATVC operation in steady state and normal operation in transients. During step-up load the ATVC operates as a buck converter and during step-down load, the ATVC operates as a boost converter while the main converter operates at low switching frequency for good efficiency.

11 Claims, 14 Drawing Sheets

ACTIVE TRANSIENT VOLTAGE COMPENSATOR FOR IMPROVING CONVERTER FAST TRANSIENT RESPONSE

FIELD OF THE INVENTION

This invention relates to voltage converters and, in particular, to methods, systems, apparatus and devices for increasing the fast transient response, power density and efficiency of a DC-to-DC converter.

BACKGROUND AND PRIOR ART

Widely applied to various electronic products, a DC-to-DC converter provides the functions of regulating the voltage level from a DC input voltage, such as boost or buck voltage conversion, and of maintaining the regulated voltage at the desired level. Under the transient high slew rate load, the unbalanced current between the DC-to-DC converter and output load current is provided by filter capacitors. There are two voltage spikes under the transient load. The first output voltage spike relates to equivalent series resistance (ESR), equivalent series inductance (ESL) of filter capacitors and slew rate of the load; the second output voltage spike is determined by to the energy stored in filter inductance and filter capacitance. Commonly, a large number of bulk and ceramic capacitor mounted close to load is used to reduce the output impedance for voltage spikes suppression. But it is not a suitable solution for higher slew rate load; low output voltage high output current applications because of the cost and size limitation. Output voltage spikes are the products of the output impedance, or called load line, and the output current. High bandwidth of a converter and small output impedance helps to reduce its voltage spikes under high slew rate load and high bandwidth also helps to reduce its output impedance.

The bandwidth of a converter is mainly limited by three delay times: the filter inductor capacitance (LC) delay time, controller delay time, and propagation delay time. Examples of propagation delays in DC-to-DC converters include signal sensing delay, driver delay, control IC delay, and extra optocoupler delay in isolated DC-to-DC converter. The key limitation of the current slew rate of the converter is the equivalent filter inductance. A known solution for improving the output slew rate involves increasing the switching frequency to reduce the equivalent inductance. However, the increase in switching frequency results in deterioration of converter efficiency. An attractive solution is extra dynamic channel with high switching frequency operation because it only operates during transient periods.

Current injection topology, such as linear mode current injection topology and switching mode current injection topology, handles the transient current and the main converter handles the static current. It is an attractive extra dynamic channel for transient response improvement technique because this technique allows high slew rate current injection in step-up load and energy absorption in step-down load while the main converter maintaining an optimal converter design for improved efficiency.

FIG. 1 is a schematic diagram a DC-to-DC converter including a main converter 12 and incorporating a linear mode current injection topology 14 according to the prior art. The linear mode current injection topology 14 solution injects high slew rate current $I_{Lin}$ to the DC-to-DC converter 10 during step-up operation and clamps the output voltage $V_o$ using resistive dissipation. However, the efficiency of the DC-to-DC converter 10 is reduced due to the large conduction loss in linear mode current injection topology related with the high voltage drop ($V_{in}-V_O$) and the high current stress ($I_O-I_p$).

FIG. 2 is a schematic diagram of switching mode current injection topology 16 of the prior art. Switching mode current injection topology 16 operates at high frequency to reduce the filter inductance $L_{sw}$ to achieve a high slew rate current $I_{sw}$ injection during step-up load as a buck converter. During step-down operation recycles energy to the input voltage V1 as a boost converter. However, switching mode current injection topology results in a large power loss due to high current stress ($I_O-I_p$) combined with the high switching frequency operation.

The high power loss resulting from use of current injection topology is the impediment to wide scale application because the imbalance between the output current and the current provided by the main converter all conduct through the current injection topology. For current injection topology, a large conduction loss in linear mode 14 or switching loss in switching mode 16 results due to the high current stress and the high switching frequency. For these reasons, current injection topology is not a good solution for high slew rate current, high efficiency power conversion application, especially for converters having low voltage, high current output.

The present invention advances the art by providing a method, system, apparatus and device for reducing the output impedance for voltage spikes suppression by providing an active transient voltage compensator for use with isolated or non-isolated DC-to-DC converters. The active transient voltage compensator injects the voltage source instead of the current source in prior arts current injection topology. During transient periods, the active transient voltage compensator provides high slew rate current due to small leakage inductance of the transformer.

SUMMARY OF THE INVENTION

A primary objective of the invention is to provide a new method, system, apparatus and device to improve the fast transient response of a DC-to-DC converter.

A secondary objective of the invention is to provide a new method, system, apparatus and device to maintain the compensator only engaged in transients, no operation in steady state.

A third objective of the invention is to provide a new method, system, apparatus and device to improve the fast transient response of a DC-to-DC converter while keeping main converter high efficiency with low operating frequency.

A forth objective of the invention is to provide a new method, system, apparatus and device to provide a transformer to reduce the current handled by the compensator to reduce conduction loss and switching loss to improve the efficiency of the compensator.

A fifth objective of the invention is to provide a new method, system, apparatus and device to provide a compensator to reduce the output impedance of the DC-to-DC converter for fast transient response.

Further objects and advantages of this invention will be apparent from the following detailed description of preferred embodiments, which are illustrated, schematically in the accompanying drawings.

DESCRIPTION OF THE PREFERRED EMBODIMENTS

Figure 1:
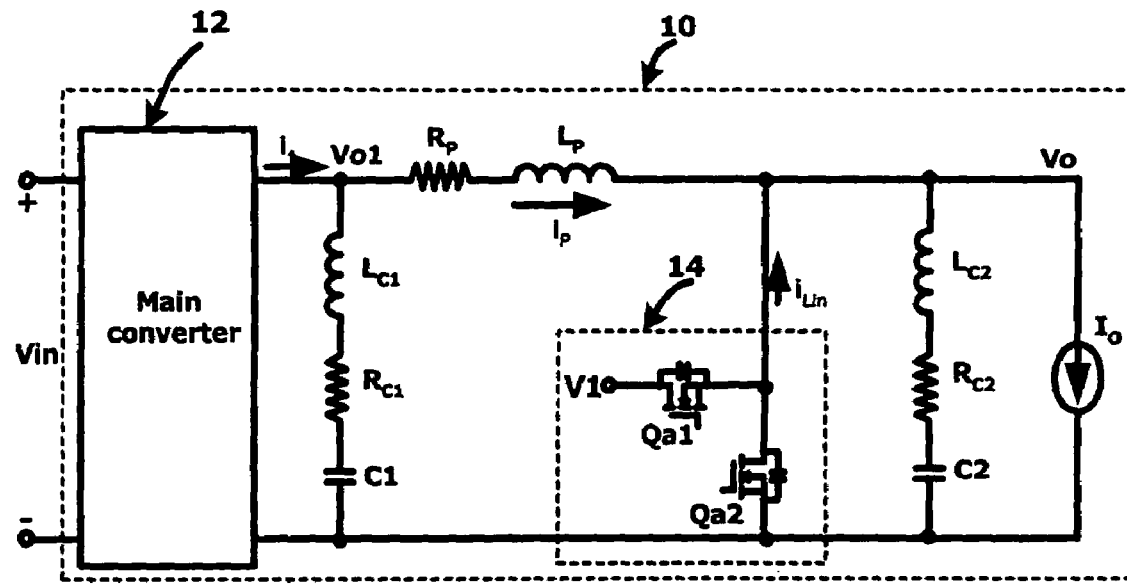
FIG. 1 is a schematic diagram of a prior art DC-to-DC linear mode current injection topology.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

Figure 3:
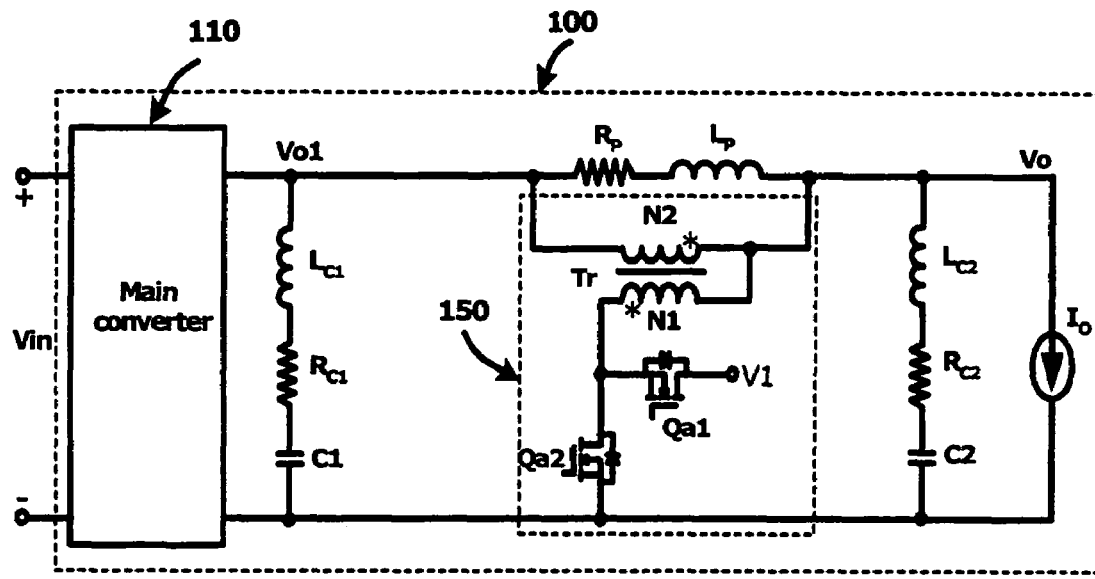
FIG. 3 is a schematic diagram of a DC-to-DC converter using the active transient voltage compensator of the present invention.

The following is a list of the reference numbers used in the drawings and the detailed specification to identify components:

Reference No. Component
10 Prior art DC-to-DC converter
12 Main converter
14 Linear mode current injection topology
16 Switching mode current injection topology
100 DC-to-DC converter
110 Main converter
120 DC-to-DC converter with controller block diagram
150 Active transient voltage compensator (ATVC)
160 Main converter controller
161 Step up controller for ATVC
162 Step down controller for ATVC
163 Logic block for ATVC
164 ATVC controller
210 Operational current waveform
212 Minimum current $I_{min}$
213 Output current $I_O$ ramp up
214 Main converter output current $I_1$ increase
216 Maximum output current $I_{max}$
217 Output current $I_O$ decrease
218 Main converter output current $I_1$ ramp down
220 Reference voltage waveform
221 Reference voltage Vref1
222 Reference voltage Vref
223 Reference voltage Vref2
230 ATVC current waveform $I_{ATVC}$
240 Transformer primary current $I_{1N}$ waveform
250 Transformer magnetizing inductance current $I_{LM}$ waveform
260 $Q_{a1}$ driver signal voltage waveform
270 $Q_{a2}$ driver signal voltage waveform The method, system, apparatus and device of the present invention reduce output voltage spikes in transients and improve the transient response by providing an active transient voltage compensator (ATVC) for use with isolated or non-isolated DC/DC converters. FIG. 3 is a schematic diagram of a conventional DC-to-DC converter 100 incorporating the active transient voltage compensator 150 of the present invention. The components of the ATVC differ from the prior art linear and switching mode current injection topologies by the inclusion of the transformer $T_r$ in addition to the synchronous rectifiers $Q_{a1}$ and $Q_{a2}$. FIG. 4A is a schematic according to FIG. 3 including the magnetizing inductance $L_M$, resistance $R_{LM}$ of magnetizing inductance, and leakage inductance $L_{LK}$ of the ATVC transformer $T_r$.

Figure 4:
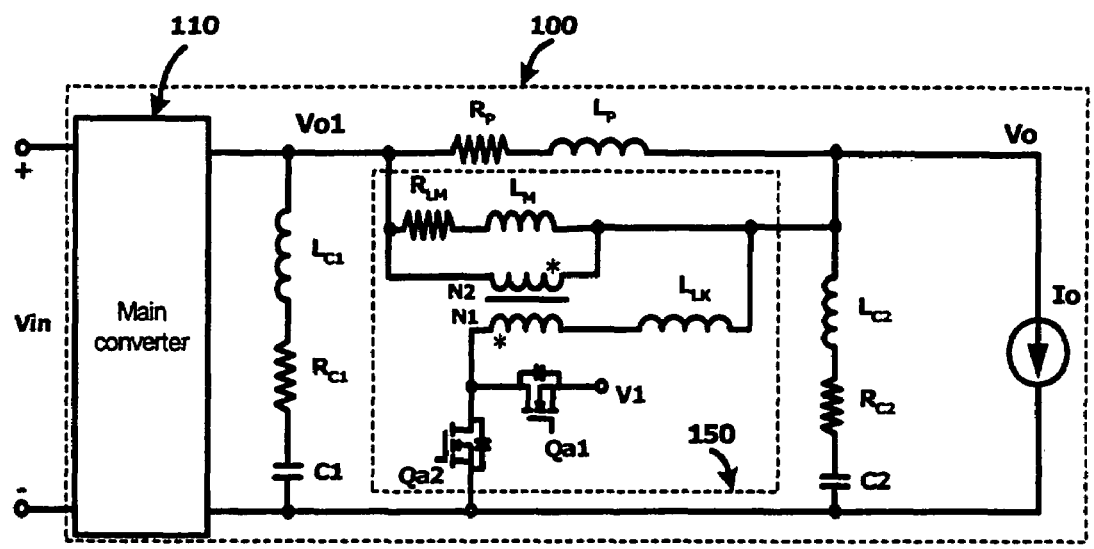
FIG. 4A is a schematic diagram of a DC-to-DC converter of FIG. 3 including the magnetizing inductance, the resistance of magnetizing inductance and leakage inductance $L_{LK}$ of the active transient voltage compensator transformer.
FIG. 4B is a schematic diagram of a DC-to-DC converter of FIG. 3 including the controller block diagram of the main converter and the controller block diagram of the active transient voltage compensator.
Figure 4B:
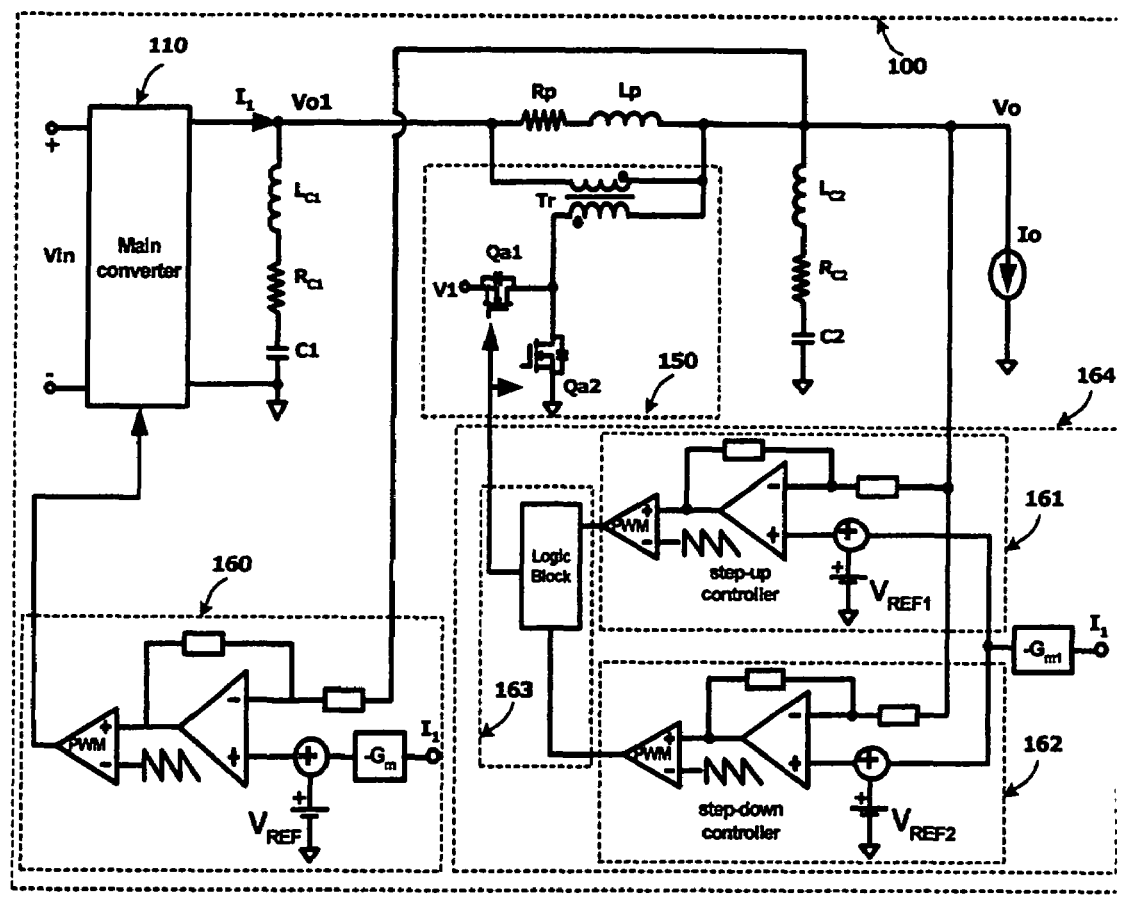

FIG. 4B is a schematic diagram of a DC-to-DC converter of FIG. 3 including the controller block diagram 160 of the main converter 110 and the controller block diagram 164 of the active transient voltage compensator 150. The main converter 110 regulates the output voltage level by the close loop controller 160 with reference voltage Vref 222, which feedbacks output voltage Vo and output current I1 with the gain Gm. ATVC controller 164 has two controllers: step-up controller 161 with reference voltage Vref1 221 and step-down controller 162 with reference voltage Vref2 223. The step-up controller generates the driver signal of Qa1 only in the step-up load mode and the step-down controller generates the driver signal of Qa2 only in the step-down load mode. The logic block 163 in ATVC controller 164 is used to keep no ATVC operation in steady state and generate complimentary driver signal for Qa2 in step-up load mode and complimentary driver signal for Qa1 in step-down load mode in transient periods.

As identified in FIGS. 3 and 4A, $V_{in}$ is the input voltage applied to the main converter 110. The main converter 110 has an output voltage $V_{O1}$ and a corresponding output current $I_1$. The main converter 110 includes a filter capacitor $C_1$ connected across the output. The filter capacitor $C_1$ and the equivalent series inductance $L_{C1}$ and equivalent series resistance $R_{C1}$ of filter capacitor $C_1$ are illustrated as serial components connected in parallel across the output of the main converter 110. The parasitic parameters of trace, socket are illustrated as resister $R_P$ and inductor $L_P$ parallel connected with the active transient voltage compensator 150 of the present invention. A second filter capacitor C2 is connected across the DC-to-DC converter output as decoupling capacitors. The capacitor $C_2$ and the equivalent series inductance $L_{C2}$ and equivalent series resistance $R_{C2}$ associated with capacitor C2 are illustrated as serially connected across the output. The output of the DC-to-DC 100 incorporating the transient voltage compensator 150 according to the present invention are identified as output voltage $V_O$ and output current $I_O$. Alternative configuration for coupling the ATVC of the present invention with a DC-to-DC converter will be obvious to those skilled in the art.

During transient periods, the equivalent inductance of the ATVC is approximately equal to the leakage inductance of the transformer, while maintaining normal inductance of winding N2 that is paralleled with the parasitic $R_P$ and $L_P$ during steady state operation. At the same time the ATVC transformer $T_r$ injects a serial positive voltage source to provide a high slew rate current with the input voltage. Conversely, in step-down load, the active transient voltage compensator transformer provides a serial negative voltage to absorb high slew rate current with the output voltage. Using the transformer $T_r$, current handled by the ATVC is reduced, which contributes to a reduced conduction loss and switching loss in the ATVC.

There are three main modes for operation of the ATVC, step-up load mode, steady-state mode, and step-down load mode. In step-up load mode, the imbalance between the main converter 110 output current $I_1$ and the DC-to-DC converter output current $I_O$ results in a drop in the output voltage $V_O$. The decrease in the output voltage may even fall out of the DC-to-DC converter specification output voltage requirement.

To overcome the problem, the ATVC 150 kicks in as a buck converter by controlling $Q_{a1}$ with the driver signal 260 to compensate the output voltage $V_O$ when the output voltage $V_O$ falls below the ATVC voltage $V_{REF1}$ 221. The driver signal of Qa2 270 is complimentary with the driver signal of Qa1 260 in step-up load mode.

Figure 6A:
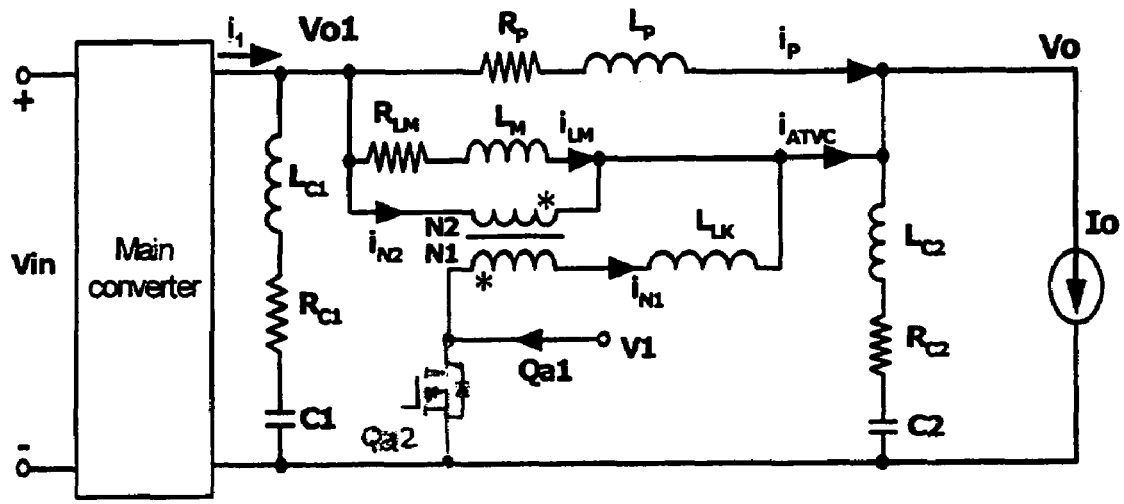
FIG. 6A is a schematic of the step-up load mode operation of the active transient voltage compensator corresponding to time t1 to t1' as shown on the graph of FIG. 5.
Figure 6B:
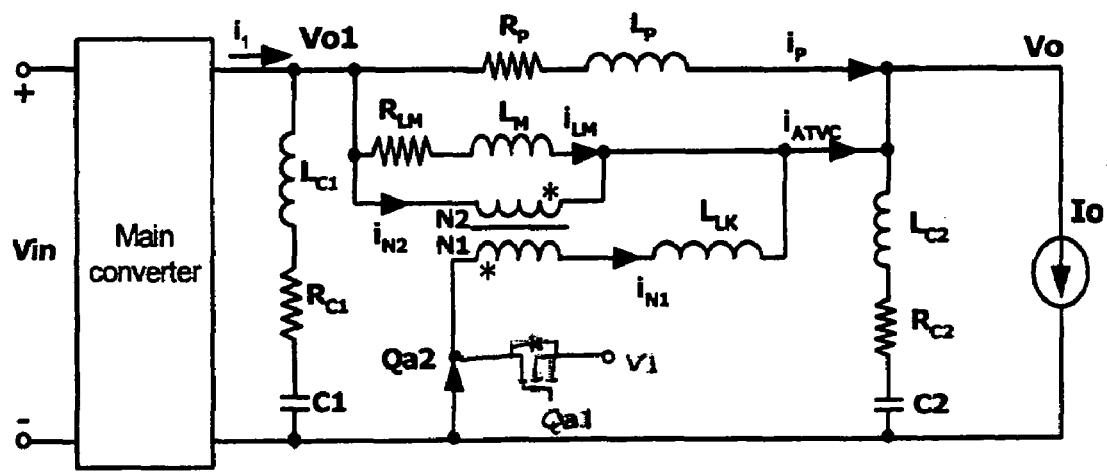
FIG. 6B is a schematic of the step-up load mode operation of the active transient voltage compensator corresponding to time t1' to t2 as shown on the graph of FIG. 5.

The ATVC 150 of the present invention injects a high slew rate current, which is based on the transformer leakage inductance $L_{LK}$ and the difference between the ATVC 150 supply voltage $V_1$ and the DC-to-DC converter output voltage $V_O$ as shown in FIG. 6A. The primary current $I_{N1}$ of the ATVC 150 transformer $T_r$ freewheels through $Q_{a2}$ when Qa1 is off as shown in FIG. 6B. The primary current $I_{N1}$ and secondary current $I_{N2}$ of transformer $T_r$ together quickly catch up with the DC-to-DC converter output current $I_O$ because of the small value of the leakage inductance $L_{LK}$ of the transformer $T_r$. Step-up load mode ends with the transformer $T_r$ magnetizing current $I_{LM}$ increasing to the maximum output current $K \cdot I_{max}$. K is the current divider between Rp and $R_{LM}$ in steady state mode.

Figure 5:
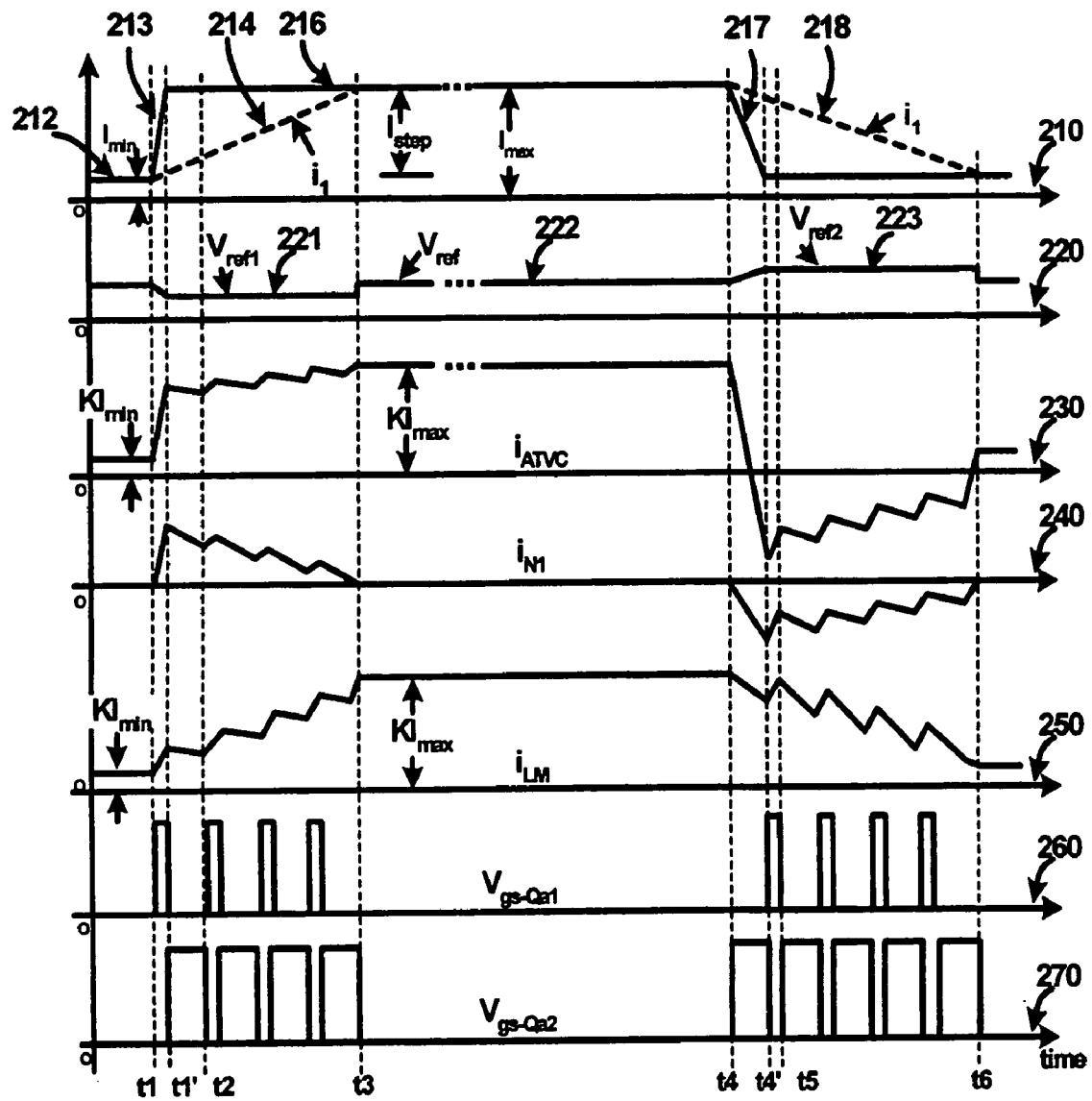
FIG. 5 is a graph illustrating graphical representations of the operational voltage and current waveforms of the DC-to-DC converter of FIG. 4A with respect to time during step-up load mode, steady-state and step-down load mode operations.

FIG. 5 is a graphical representation of operational current and voltage waveforms of the DC-to-DC converter corresponding to the operational schematics of FIGS. 6A through 6D. The first waveform 210 in FIG. 5 is a graphical representation of the main converter 110 and DC-to-DC converter 100 output currents, $I_1$ and $I_O$. Referring to waveform 210, during step-up load mode the output current ($I_O$) 213 of the DC-to-DC converter 100 increases from minimum current ($I_{min}$) 212 to the maximum current ($I_{max}$) 216 during the time period t1 to t1'. Operation of the ATVC 150 corresponding to time period from t1 to t3 in step up mode is detailed only in one switching cycle operation, Qa1 is on and Qa2 is off from t1 to t1', Qa1 is off and Qa2 is on from t1' to t2, shown in the schematic of FIG. 6A and FIG. 6B. The ATVC 150 functions to sharply increase the ATVC current ($I_{ATVC}$) 230 from minimum current ($K^*I_{min}$) to the maximum current ($K^*I_{max}$) during the time period t1 to t3 with the slowly increasing main converter output current ($I_1$) 214. This is accomplished by biasing $Q_{a1}$ "ON" and $Q_{a2}$ "OFF" by the driver signal 260 and 270, providing an essentially low impedance path to allow current to flow from voltage source $V_1$ through transformer $T_r$ primary $N_1$. The transformer primary current $I_{N1}$ and second current $I_{N2}$ with magnetizing current $I_{LM}$ increase the ATVC output current $I_{ATVC}$ to catch up with the output current $I_O$ as shown on waveforms 230, 240 and 250, respectively.

The ATVC continues to supply the current $I_{ATVC}$ as shown in waveform 230 to maintain an output current $I_O$ at $I_{max}$ 216 from time t2 to t3 as the main converters current $I_1$ as identified on the graph of FIG. 5 by the ramped up dashed line 214. Step-up load mode ends with the transformer $T_r$ magnetizing current $I_{LM}$ increasing to the current $K^*Imax$.

Figure 2:
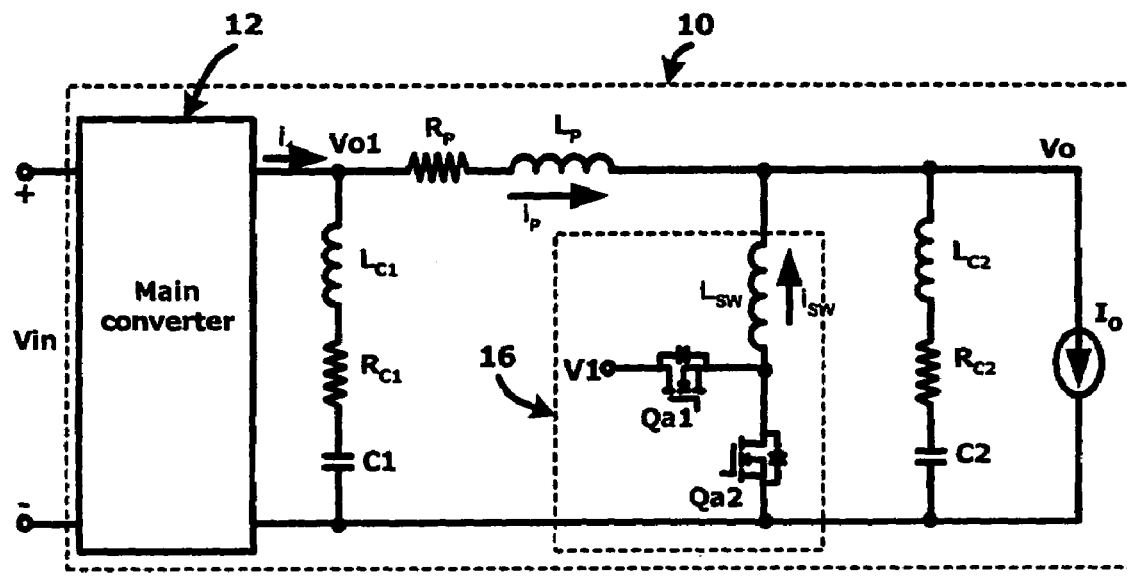
FIG. 2 is a schematic diagram of a prior art DC-to-DC switching mode current injection topology.

With the introduction of the transformer $T_r$ to the conventional DC-to-DC converter of the prior art shown in FIGS. 1 and 2, the active transient voltage compensator 150 of the present invention only handles a small current, resulting in a reduced conduction loss and switching loss in the active transient voltage compensation topology than that of the prior art current injection topology. The current handled by the active transient voltage compensator 150 is calculated according to $K^*Imax/(1+N)$ where N is the turn-ratio of the transformer (N=N1/N2). In step-up load mode, the active transient voltage compensator also provides high slew rate current, $(1+N)^*(V_1-V_{O1})/L_{LK}$, approximately (1+N) times higher than that of switching mode current injection topology if the equivalent filter inductance is same.

Figure 6C:
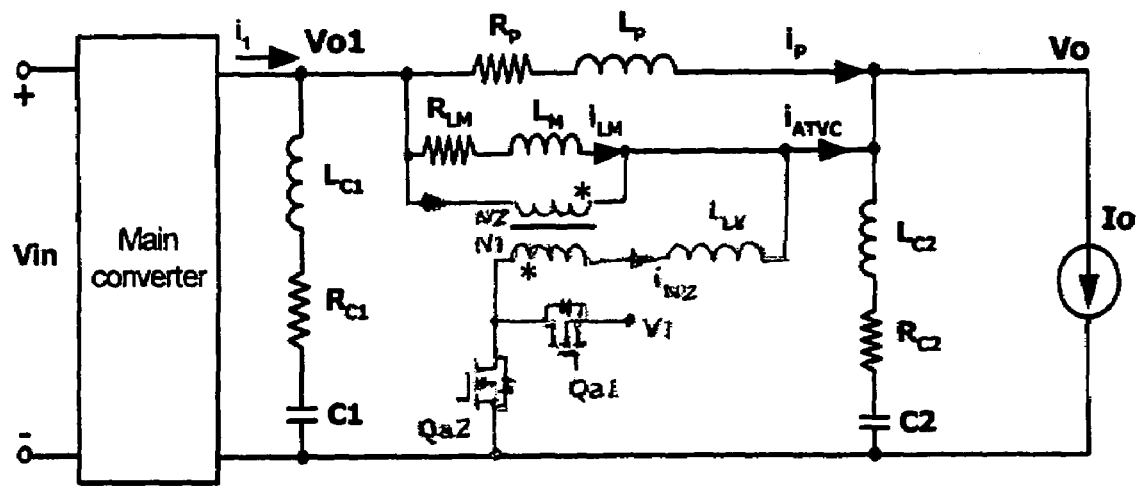
FIG. 6C is a schematic of the steady state operation of the active transient voltage compensator corresponding to time t3 to t4 as shown on the graph of FIG. 5.

In a steady-state mode, the time period on the graph of FIG. 5 between t3 and t4, is schematically illustrated in FIG. 6C. As shown, during steady-state $Q_{a1}$ and $Q_{a2}$ are biased off by the logic block 163 in the ATVC controller 164. The current of $I_{N1}$ and $I_{N2}$ equals to zero and the current $i_{LM}$ equals to $K^*Imax$, K is the current divider ratio between $R_P$ and $R_{LM}$. Design of the circuit to satisfy the following equation ensures that the active transient voltage compensator does not operate during the steady-state mode $$N \cdot V_S < V_O - V_D$$

where $V_S$ is the transformer secondary voltage and $V_D$ is the on-state voltage drop of body diode of synchronous rectifier $Q_{a2}$.

Figure 6D:
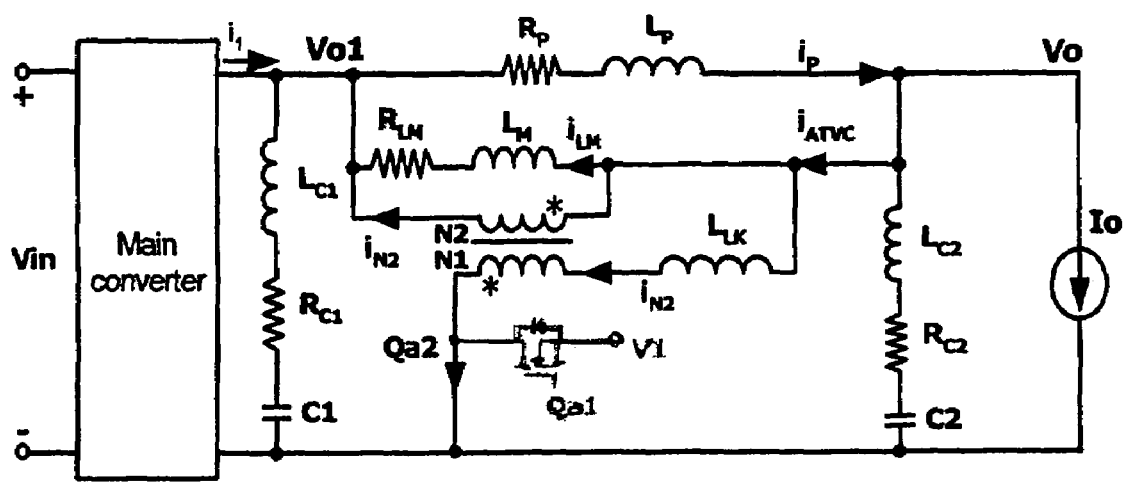
FIG. 6D is a schematic of the step-down load mode operation of the active transient voltage compensator corresponding to time t4 to t4' as shown on the graph of FIG. 5.
Figure 6E:
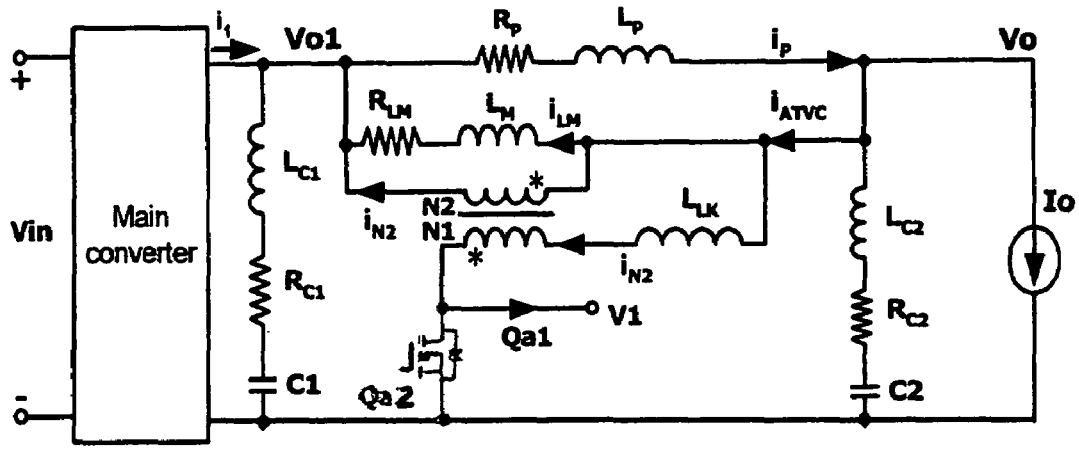
FIG. 6E is a schematic of the step-down load mode operation of the active transient voltage compensator corresponding to time t4' to t5 as shown on the graph of FIG. 5.

During the step-down load mode, the ATVC operates as a boost converter by controlling the operation of $Q_{a2}$ from the step-down controller 162 in the ATVC controller 164 when the output voltage $V_O$ is higher than the ATVC reference voltage $V_{REF2}$ 223 as shown in waveform 220 of FIG. 5. The ATVC 150 recycles energy to the ATVC input voltage V1 during t4 to t6, one switching cycle operation from t4 to t5 is detailed as shown in the schematic diagrams of FIGS. 6D and 6E. Referring to FIG. 6D, during step-down load Qa2 is biased to draw current $I_{N1}$ from transformer primary $N_1$ shown as a negative current in waveform 240, to suppress the output voltage spikes and recycle energy to ATVC input voltage $V_1$. As shown by the decreasing dashed line 218, the main converter output current $I_1$ decreases at a slower rate from time t4 to t6.

The driver signal of Qa1 as shown in 260 is complimentary with the driver signal of Qa2 as shown in 270 in step-down load mode. Referring to the operational schematic of FIG. 6E in conjunction with the graph of FIG. 5, from time t4' to time t5, the operation of the active transient voltage compensator switches $Q_{a1}$ "ON" and $Q_{a2}$ "OFF", proving a path for transformer primary current $I_{N1}$ to recycle energy to ATVC input voltage V1 to maintain the DC-to-DC converter output current $I_O$ at $I_{min}$ until the main converter current $I_1$ ramps down to $I_{min}$ at time t6, as shown by the dashed line 218 of waveform 210. Step down load mode terminates when with the transformer Tr magnetizing inductance current $I_{LM}$ shown in waveform 250 decreasing to decreasing to output current $K^*I_{min}$. Thus, during step-down load mode, when the main converter 110 output current $I_1$ exceeds $I_{min}$, the ATVC draws the excess current to maintain the DC-to-DC converter output current $I_O$ approximately at $I_{min}$.

In step-down load mode, ATVC absorbs high slew rate current, $(1+N)^*V_{O2}/L_{LK}$, approximately (1+N) times higher than that of switching mode current injection topology if the equivalent filter inductance is same. The handled current by ATVC is as 1/(1+N) times as much as the current of prior arts 14 and 16.

As described in the previous paragraphs corresponding to FIGS. 5 and 6A-E, the active transient voltage compensator 150 operates in high frequency for small equivalent filter inductance, so it injects higher slew rate current in step-up load mode and recovers energy to the ATVC input voltage $V_1$ in the step-down load mode. The active transient voltage compensator only operates in transient. The conduction loss of the transformer secondary winding N2 can be minimized by reducing the resistance of the transformer design. The inclusion of the active transient voltage compensator transformer $T_r$ reduces the conduction losses and switching losses of Qa1 and Qa2 during the transient periods compared with the higher power losses resulting from use of the prior art current injection methods. Moreover, the optimal design for improved efficiency is carried out in the main converter with improved transient response at lower high frequency operation.

In summary, the present invention provides a method, system apparatus and device for improving the fast transient response of a DC-to-DC converter using the active transient voltage compensator (ATVC) topology of the present invention. The ATVC injects high slew rate current in step-up load and recovers energy during step-down load. The introduction of a transformer in the ATVC circuit reduces the compensator channel's conduction loss and switching loss. The ATVC operates during transient periods to eliminate the effect of parasitic inductance that is series with ATVC resulting from voltage injection. The ATVC also achieves a wide bandwidth instead of pushing the main converter into high frequency operation to improve the main converters efficiency and maintains the converters output impedance while reducing the bulk capacitors.

EXPERIMENT

Figure 7:
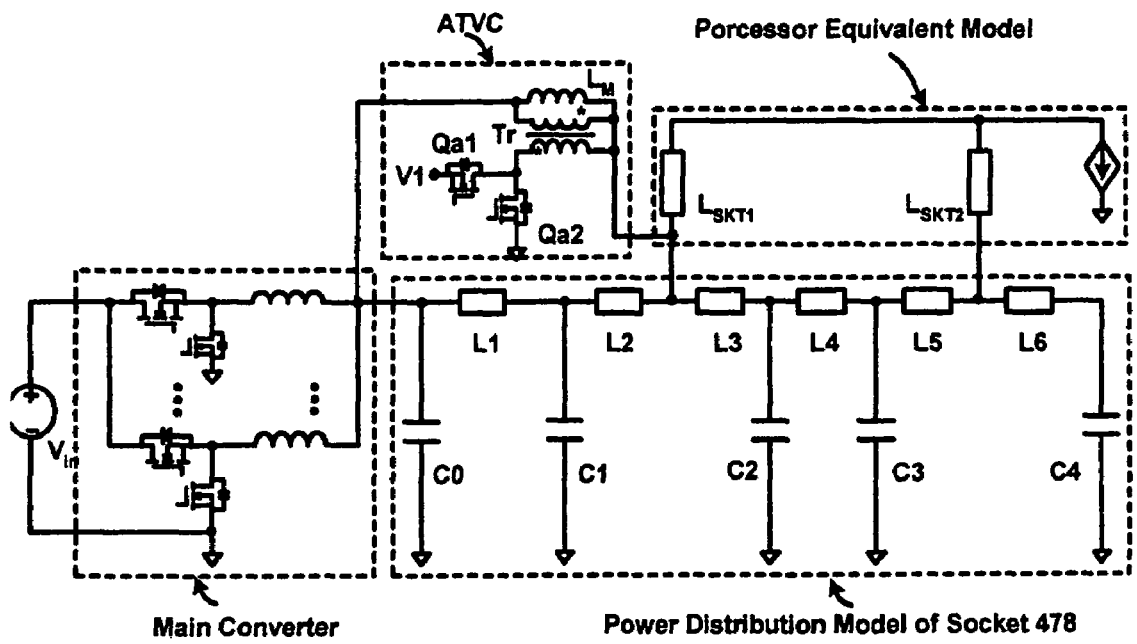
FIG. 7 is a schematic diagram of an experimental DC-to-DC converter using the active transient voltage comparator according to the present invention.

An experiment according to the DC-to-DC converter shown in the schematic diagram of FIG. 7 was carried out in the laboratory with a power distribution model for the processor with voltage regulator (VR), which was provided in VR10.0 by Intel. The DC-to-DC converter includes a main converter, filter circuit and incorporates the ATVC of the present invention between the main converter and the load. A three-phase VR and active transient voltage compensator are provided in parallel between inductor L1 and inductor L2 in the power distribution model. VR operates at 250 KHz and the ATVC is operated at 2.5 MHz. The experimental circuit is provided with a supply voltage $V_{IN}$=12VDC, an output voltage $V_O$=1.1VDC, an output current $I_O$ between $I_{max}$=100 amps and $I_{min}$=10 amps which is supplied to the load.

VRM10.0 defines dc-dc converters to meet the power supply requirements of desktop computer systems, which output voltage is 0.8375V~1.6000V with VID control code, and its current is up to 120 A; the output current slew rate for CPU is up to 1-2 A/ns. The socket load lines contain dc load line and transient load line as well as maximum and minimum voltage levels, which are measured at the processor socket dedicated pins between the voltage regulator and processor cavity.

Figure 8:
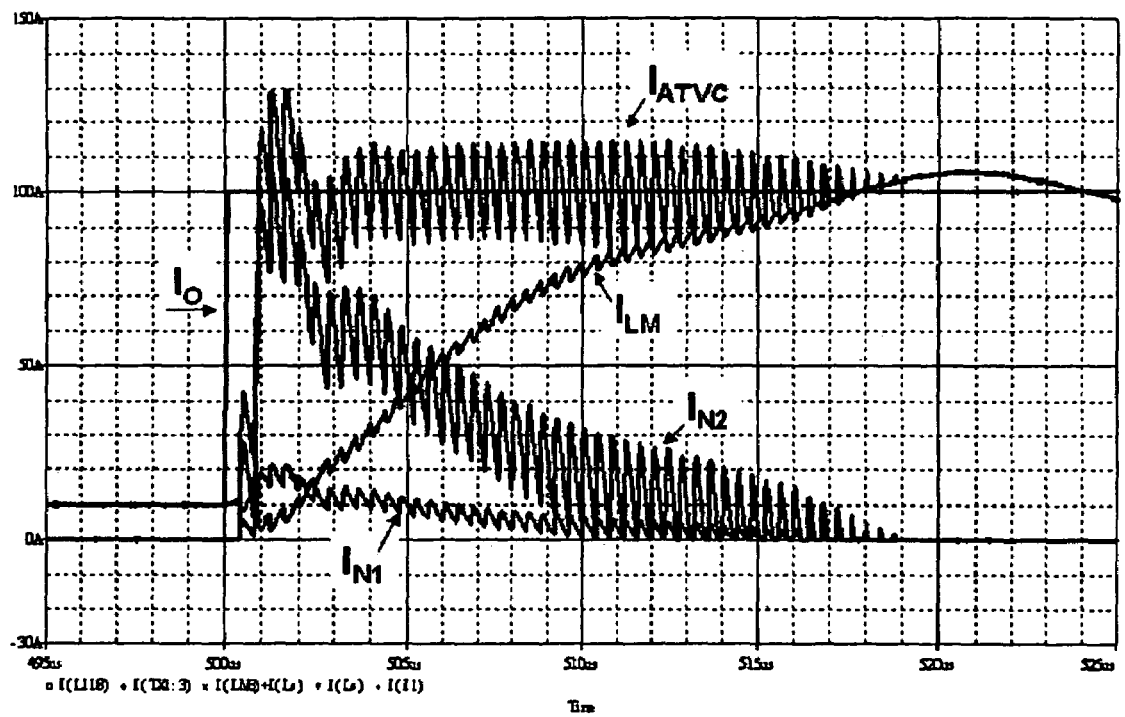
FIG. 8 shows the operational currents of the ATVC circuit in the experimental DC-to-DC converter of FIG. 7 during step-up load mode.
Figure 9:
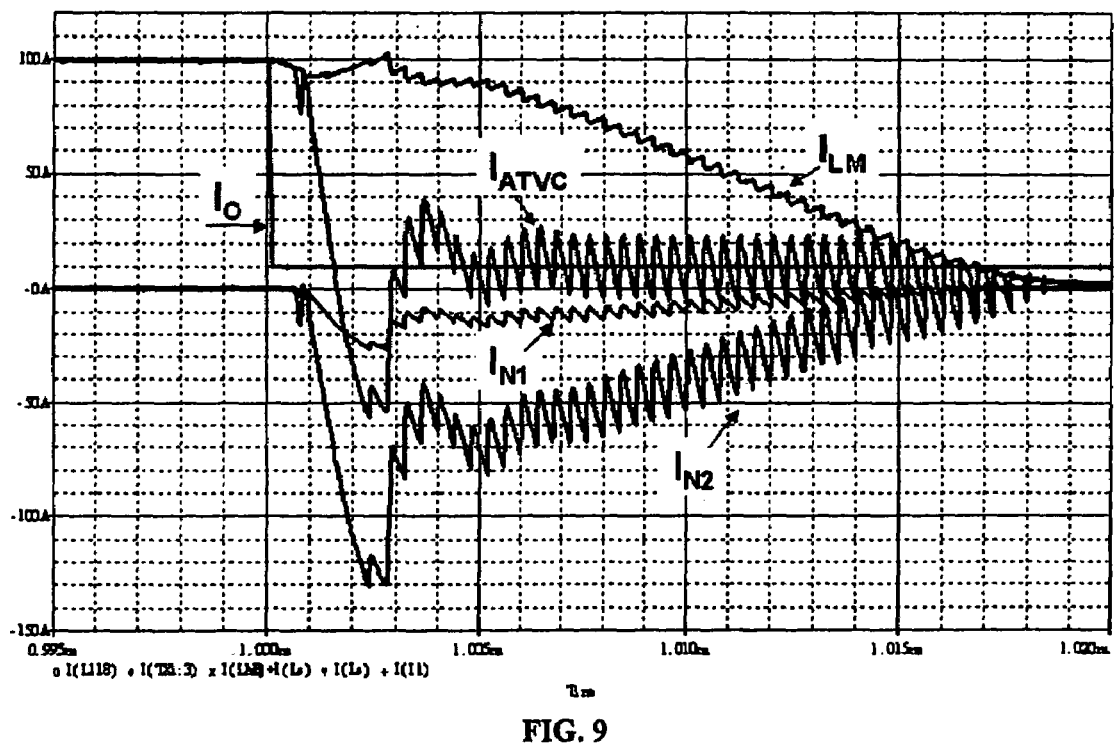
FIG. 9 shows the operational currents of the ATVC circuit in the experimental DC-to-DC converter of FIG. 7 during step-down load mode.

FIG. 8 illustrates the operational currents of the ATVC circuit including the transformer $T_r$ primary current $I_{N1}$, secondary current $I_{N2}$, the magnetizing inductance current $I_{LM}$, and the ATVC output current $I_{ATVC}$ during step-up load mode. As shown, the ATVC circuit provides a higher slew rate positive current $I_{ATVC}$ during step-up load mode. Conversely, the operational currents provided by the ATVC during step-down load mode are shown in FIG. 9. As shown, the ATVC circuit provides a high slew rate negative current to recycle energy into the input voltage $V_1$ during step-down load mode operation.

Figure 10:
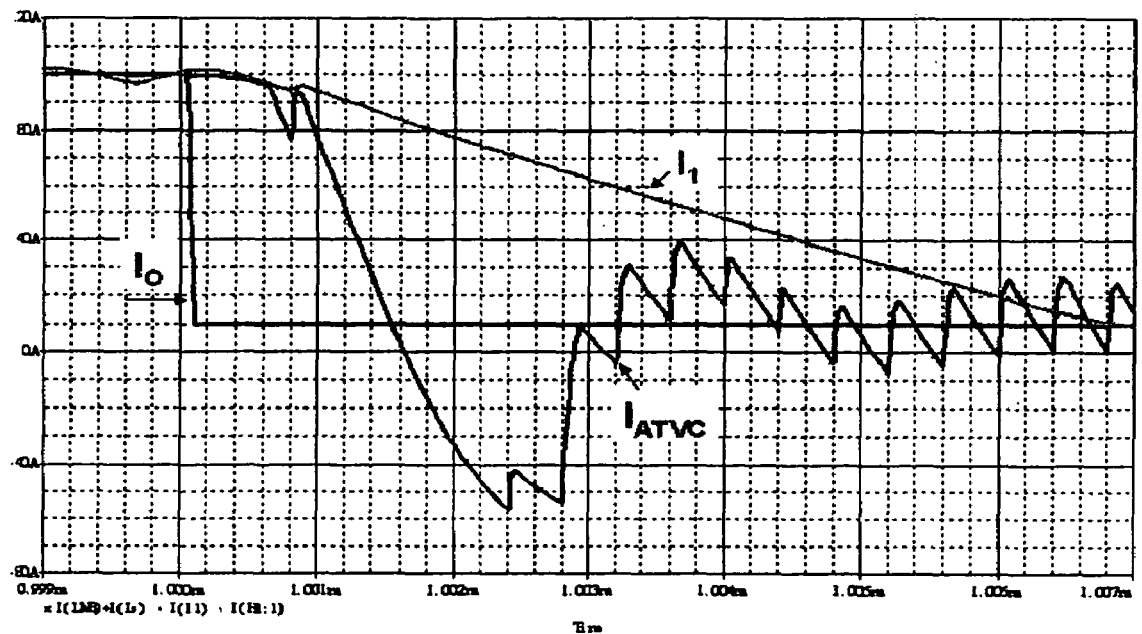
FIG. 10 show a comparison between the ATVC operational current $I_{ATVC}$, the main converter output current $I_1$ and the DC-to-DC converter output current $I_O$ during step-up load mode.
Figure 11:
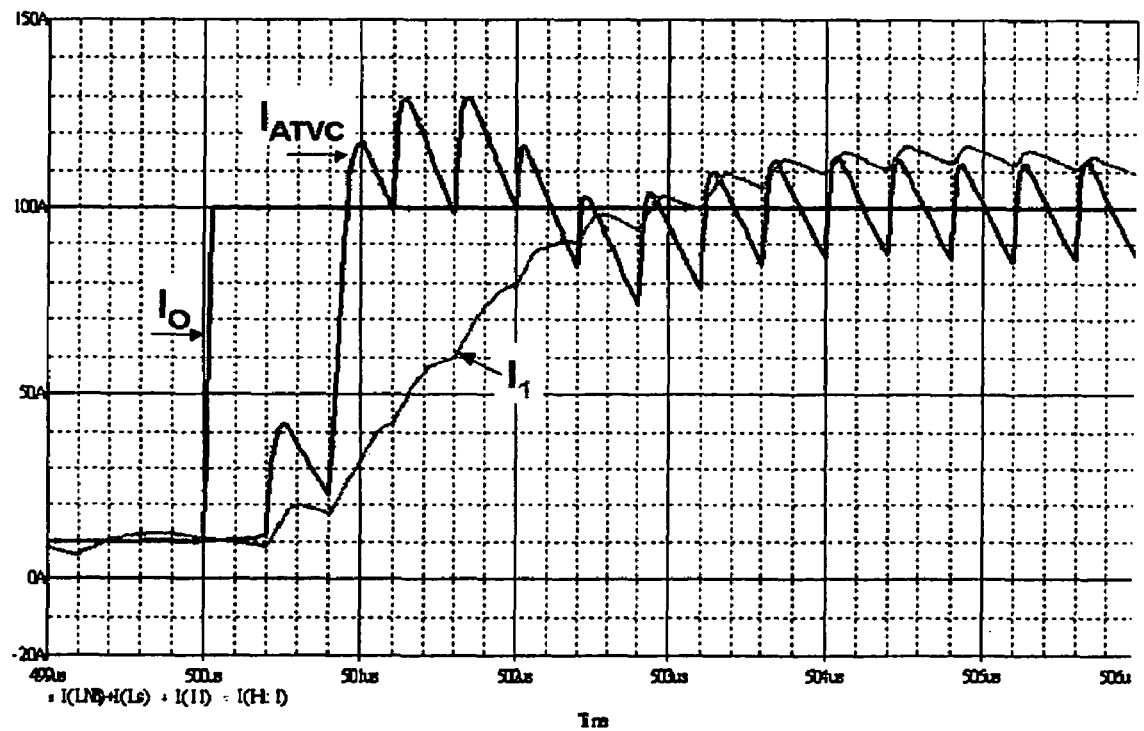
FIG. 11 show a comparison between the ATVC operational current $I_{ATVC}$, the main converter output current $I_1$ and the DC-to-DC converter output current $I_O$ during step-down load mode.

FIGS. 10 and 11 show a comparison between the ATVC operational current $I_{ATVC}$, the main converter output current $I_1$ and the DC-to-DC converter output load current $I_O$ during step-up load mode and step-down load mode, respectively. As shown in FIG. 10, the ATVC provides a higher slew rate current $I_{ATVC}$ than the output current $I_1$ provided by the main converter. According to the graph plotted in FIG. 10, the ATVC current $I_{ATVC}$ increases approximately five times faster than the main converter output current to increase the output current $I_O$ from $I_{min}$=10 amps to $I_{max}$=100 amps. Likewise, during step-down load mode, the slew rate of the current provided by the ATVC decreases approximately five times faster than the main converter output current $I_1$ as the ATVC recycles energy into the input voltage source for improved efficiency.

Figure 12A:
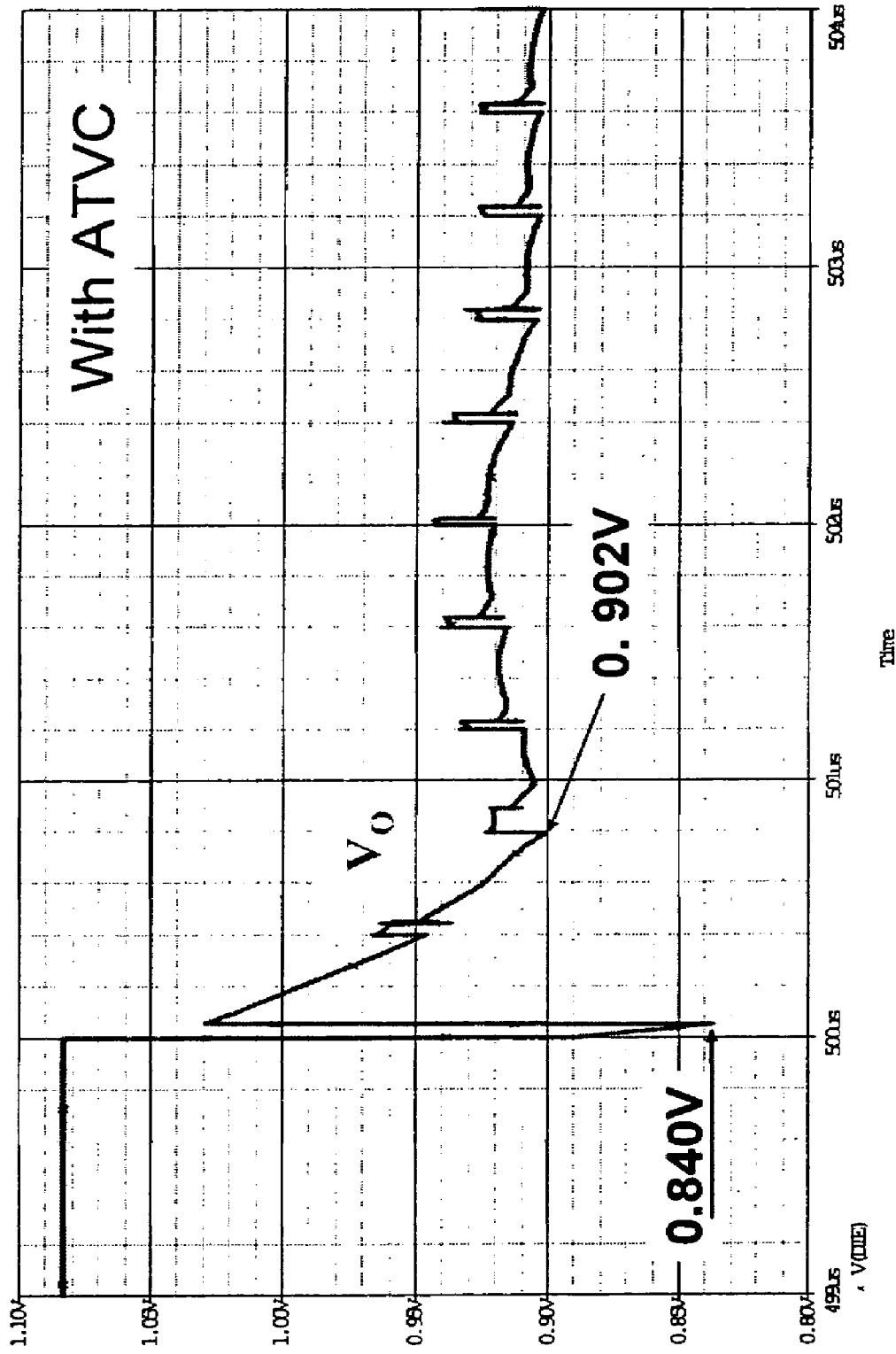
FIGS. 12A and 12B are graphs of the DC-to-DC converter output voltage $V_O$ during step-up load mode with ATVC and without ATVC, respectively.
Figure 12B:
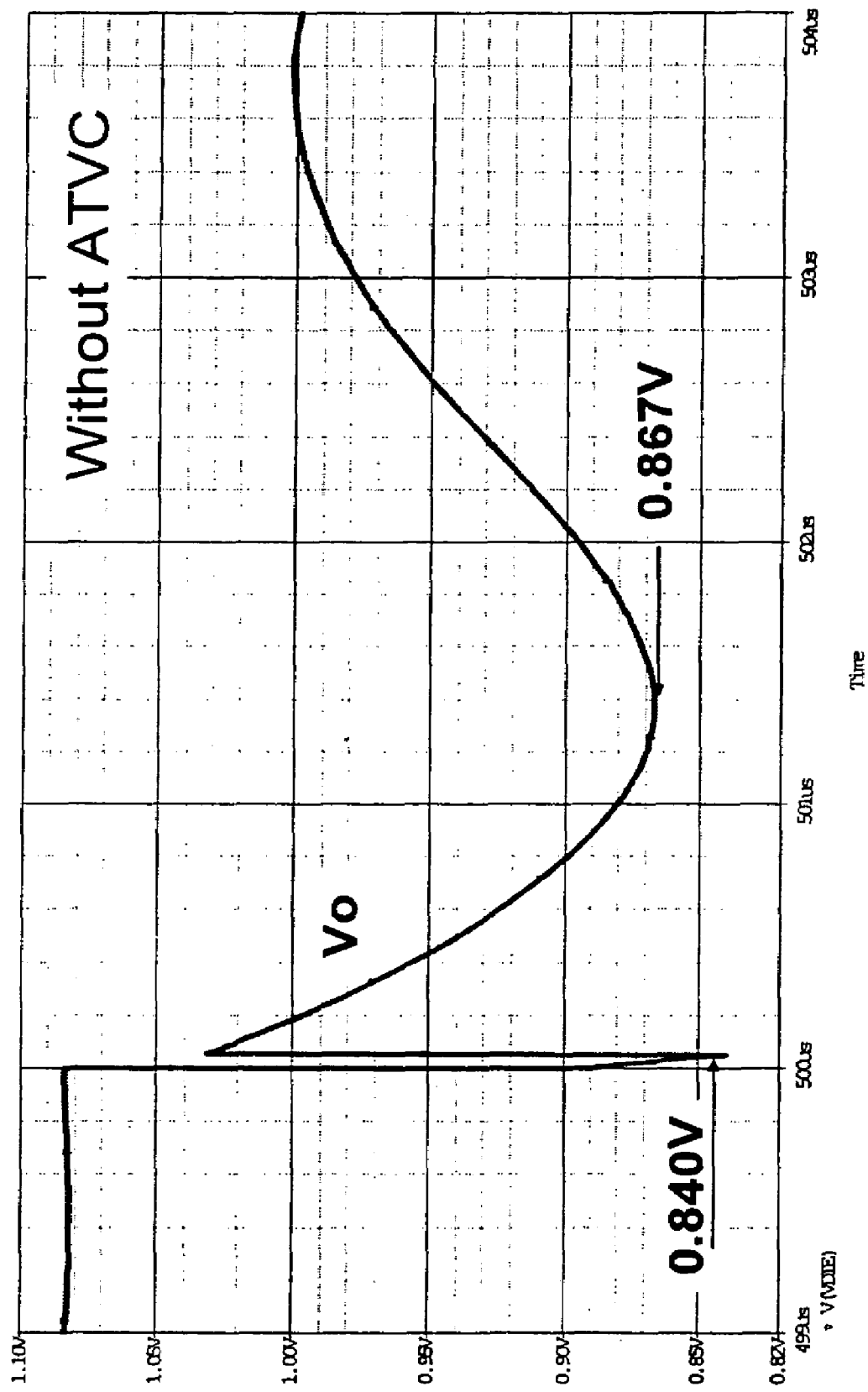
Figure 13A:
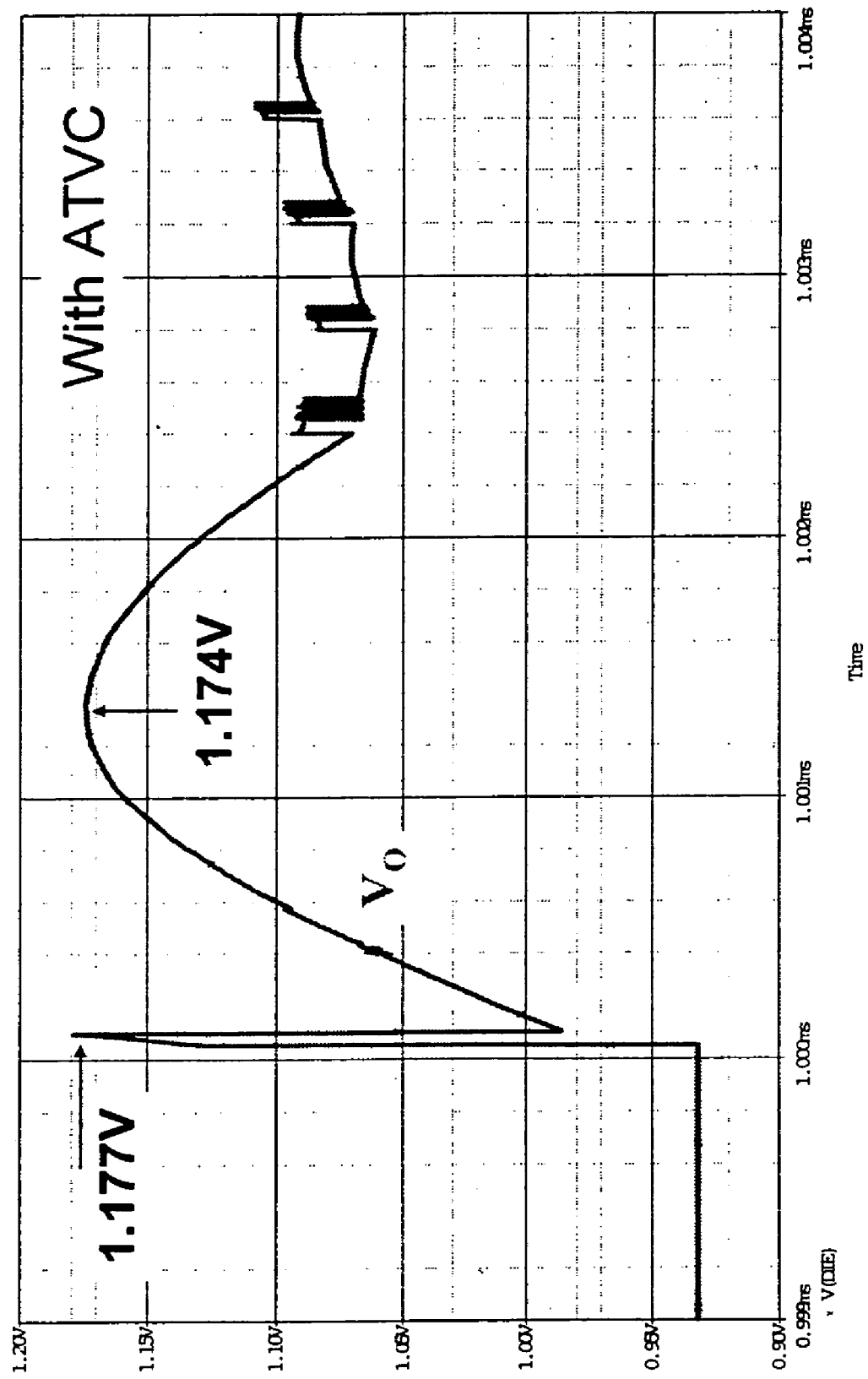
FIGS. 13A and 13B are graphs of the DC-to-DC converter output voltage $V_O$ during step-down load mode with ATVC and without ATVC, respectively.
Figure 13B:
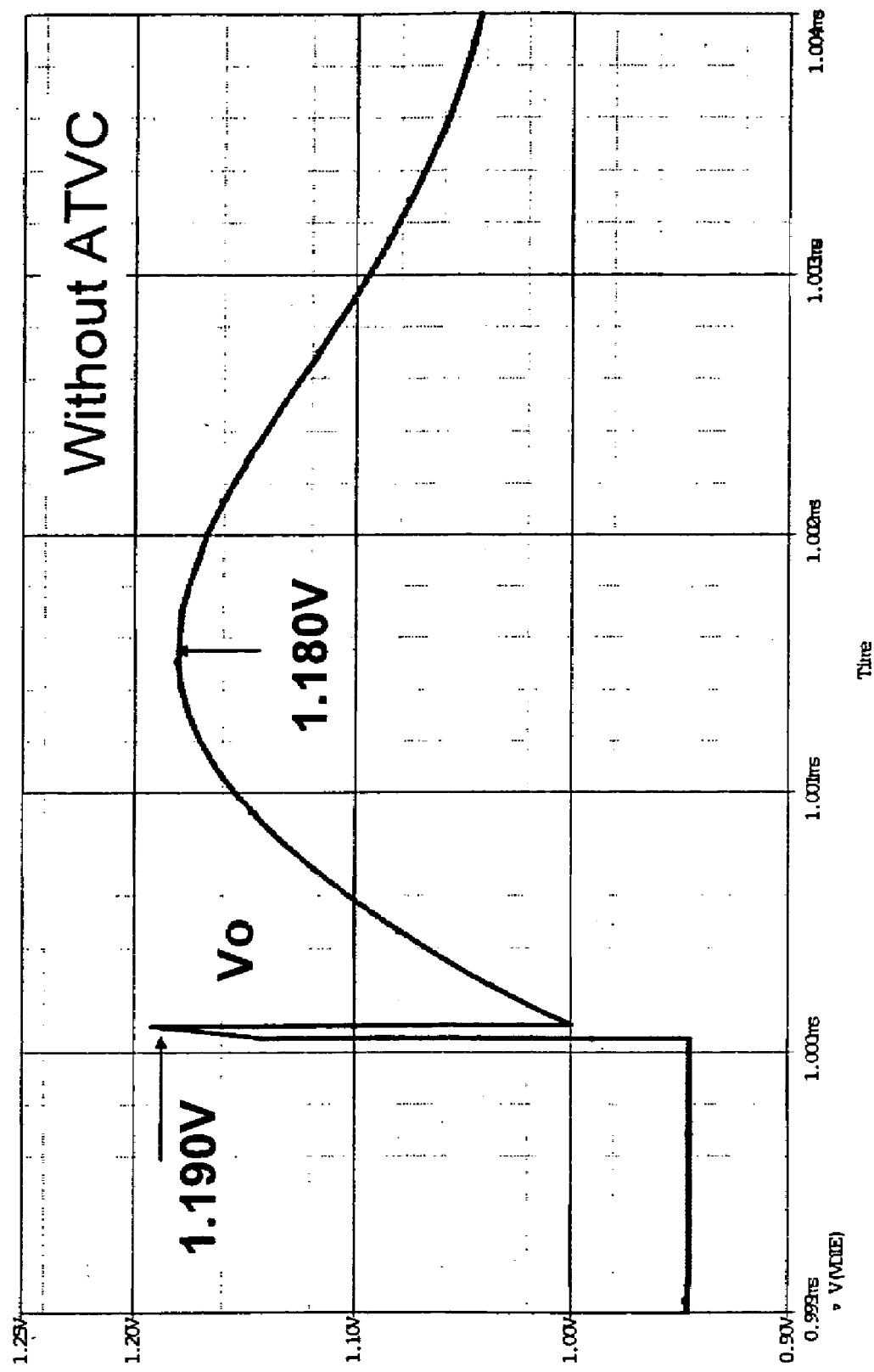

FIGS. 12A and 12B are graphs of the DC-to-DC converter output voltage $V_O$ during step-up load mode with ATVC and without ATVC, respectively. As shown in FIG. 12B, during step-up load mode without ATVC the output voltage VO includes two spikes. The first spike is the result of performance of capacitors and layout, ESR and ESL while the second spike is mainly determined by the closed loop design of the circuit. When the DC-to-DC converter incorporates the ATVC of the present invention, an improvement in the second voltage spike is shown in FIG. 12A. Similarly, an improvement in the second spike is observed when the graph of the output voltage $V_O$ during step-down load mode without ATVC (FIG. 13B) is compared to the output voltage VO with ATVC as shown in FIG. 13A.

Figure 14:
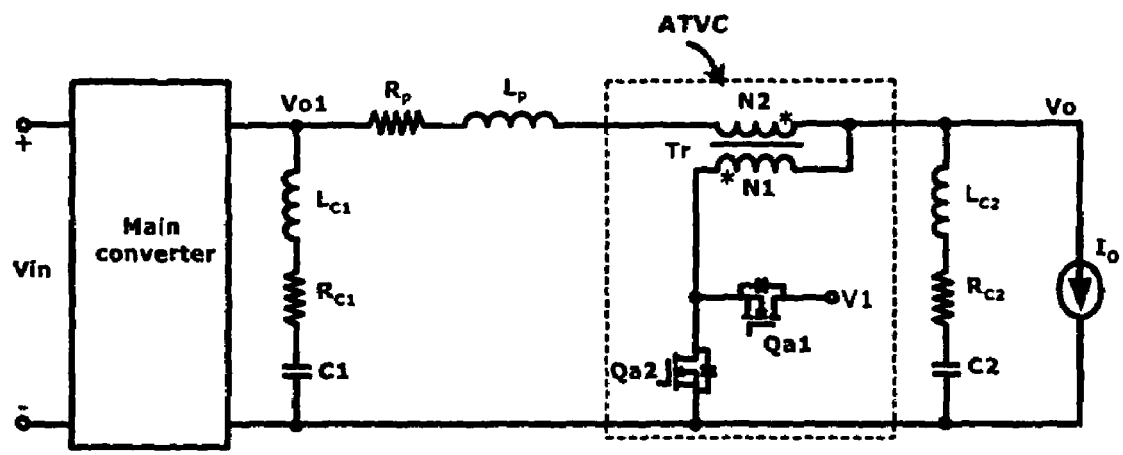
FIGS. 14, 15 and 16 are schematic diagrams of alternative DC-to-DC circuits utilizing the ATVC of the present invention.
Figure 15:
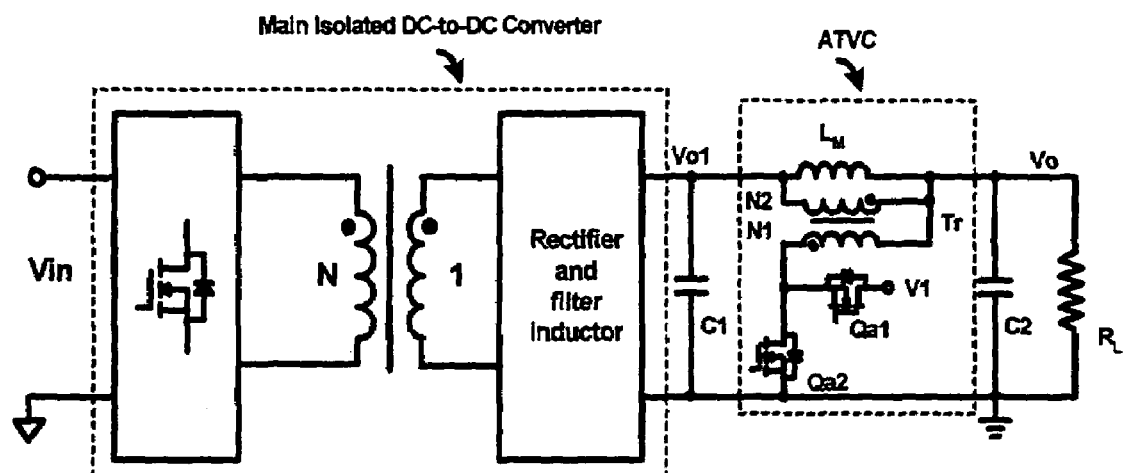
Figure 16:
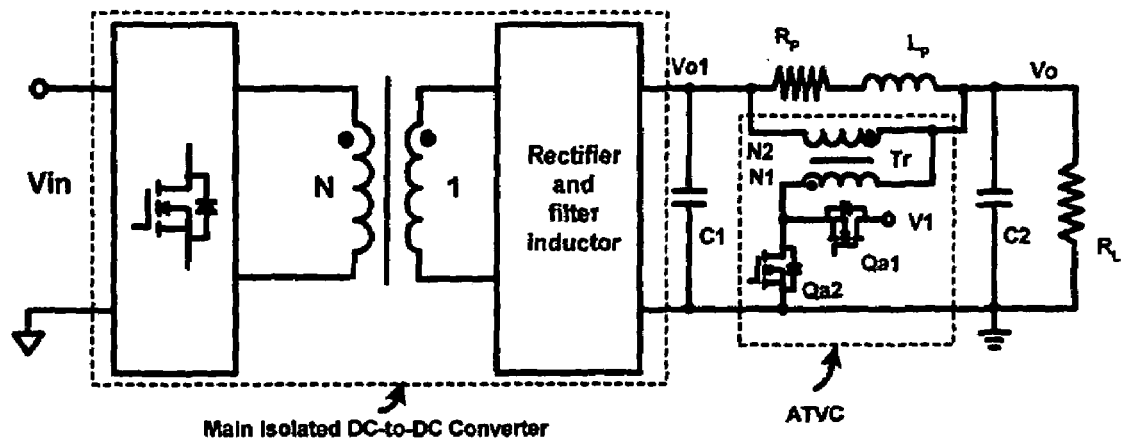

While the method, system, apparatus and device of the present invention has been illustrated and discussed when utilized the DC-to-DC converter as shown in FIG. 4, the ATVC mat be utilized in other DC-to-DC converters, including but not limited to, the DC-to-DC converters circuits shown in FIGS. 14, 15 and 16. FIGS. 15 and 16 are schematic diagram of an isolated DC-to-DC converter using the ATVC of the present invention to improve transient response without pushing high frequency operation for the main isolated converter where Rp and Lp represent the parasitic parameters.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A direct current to direct current (DC-to-DC) converter having an improved fast transient response, the converter comprising:
   a DC-to-DC main converter having an input terminal and a DC output terminal with a first and second capacitor connected across the output terminal; and
   an active transient voltage compensator (ATVC) connected in parallel with the output terminal between the first and second capacitor, the active transient voltage compensator comprising:
      a transformer having a primary winding and a secondary winding, one end of the secondary winding connected to one end of the first capacitor to provide a stepped inductance during the transient operation to compensate the output voltage while maintaining normal inductance during the steady state operation;
      a switching circuit having a step-up synchronous rectifier and a step-down synchronous rectifier connected with one end of the transformer primary for controlling a transformer current, the other end of the primary and secondary connected to one end of the second capacitor; and
      an ATVC controller connected to the ATVC for monitoring the output voltage and producing a driver signal for activating one of the step-up and step-down synchronous rectifiers to inject a voltage source to compensate the output voltage when the output voltage falls below an ATVC reference voltage and increases above the reference voltage, respectively, to compensate the DC output terminal output voltage during a transient operation without switching loss during a steady-state operation.

2. The converter of claim 1, wherein the ATVC controller comprises:
   a step-up control with the reference voltage for step-up mode, and
   a step-down control with the reference voltage for step-down mode, and
   a logic block to control no ATVC operation in steady state and normal operation in transient, wherein the ATVC injects the voltage source to improve transient response of the DC-to-DC converter.

3. The converter of claim 1, wherein the ATVC operates as a buck converter to compensate the output voltage when the output voltage falls below an ATVC reference voltage.

4. The converter of claim 1, wherein the ATVC operates as a boost converter to recycle a DC output terminal energy when the output voltage exceeds and ATVC reference voltage.

5. The converter of claim 1, wherein the DC-to-DC converter is an isolated DC-to-DC converter, wherein the ATVC improves transient response without pushing high frequency operation for the main converter.

6. The improved converter of claim 1, wherein the DC-to-DC converter is a non-isolated DC-to-DC converter.

7. A method for improving transient response for direct current to direct current (DC-to-DC) converter, the method comprising the steps of:
   connecting a first and second capacitor and an active transient voltage compensator (ATVC) in parallel with the main converter, the ATVC connected between the first and second capacitor; and
   injecting a voltage source during step-up load mode and step-down load mode to improve transient response during transient operation to compensate an output voltage to maintain output voltage requirements, wherein the ATVC handles a small current in transient loads that results in a reduction of conduction and switching losses and improves the injected current slew rate.

8. The method of claim 7, wherein the voltage injection step comprises the steps of:
   comparing a DC converter output voltage to an ATVC reference voltage;
   when the DC converter output voltage is less than the ATVC reference voltage, operating the ATVC as the buck converter to increase the first converter output current to achieve the maximum current; and
   when the DC converter output voltage is greater than the ATVC reference voltage, operating the ATVC as the boost converter to decrease the first converter output current to achieve the minimum current, wherein the ATVC compensates the output voltage to maintain output voltage specification requirements.

9. The method of claim 8, wherein the buck converter operation step comprises the steps of:
   providing a current path for conducting a forward ATVC current through the ATVC; and
   providing a coupler with the ATVC for coupling the forward ATVC current with the first converter output current to achieve the maximum output current.

10. The method of claim 8, wherein the buck converter operation step comprises the steps of:
    providing a first path for routing a first ATVC current through the ATVC;
    coupling the first ATVC current with the first converter output current to produce a second converter output current;
    terminating the first path when the second converter output current reaches a maximum output current;
    providing a second path for routing a second ATVC current through the ATVC;
    coupling the second ATVC current with the converter output current to maintain the an output voltage within converter specifications; and terminating the second path when the first converter output current is substantially equal to the maximum output current.

11. The method of claim 7, wherein the boost converter operation step comprises the steps of:

providing a first path for routing a first reverse current through the ATVC;

terminating the first path when the second converter output current reaches the minimum output current;

providing a second path for routing a second reverse current through the ATVC; and terminating the second path when the first converter output current is substantially equal to the minimum output current.

\* \* \* \* \*